H. W. WARREN.
CHANGEABLE SPEED GEAR.
APPLICATION FILED DEC. 18, 1918.

1,395,067.

Patented Oct. 25, 1921.
2 SHEETS—SHEET 1.

Inventor
Herbert W. Warren
By Victor J. Evans
Attorney

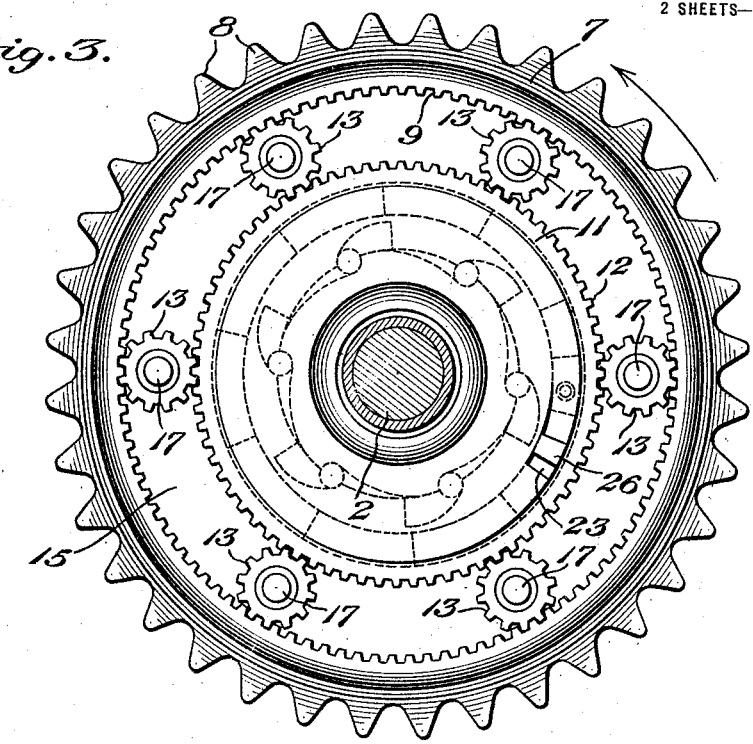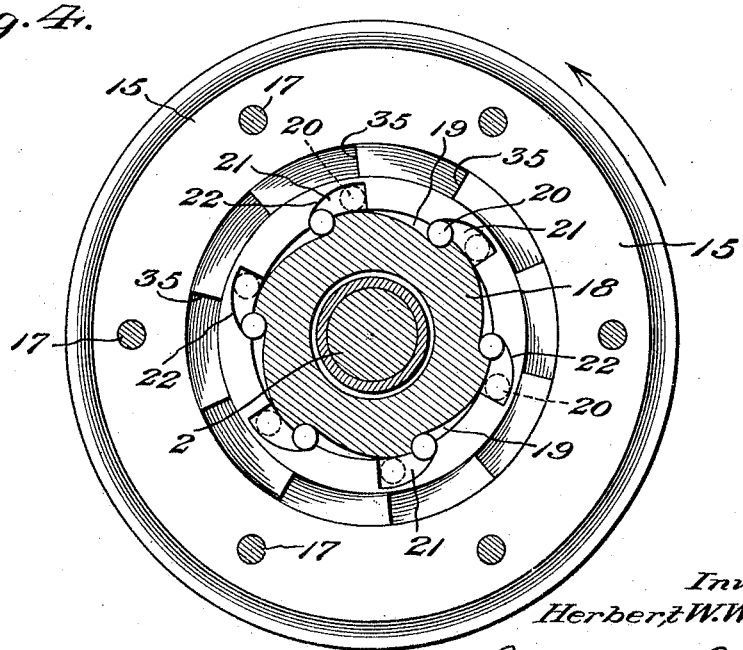

UNITED STATES PATENT OFFICE.

HERBERT W. WARREN, OF OSSEO, MICHIGAN.

CHANGEABLE-SPEED GEAR.

1,395,067. Specification of Letters Patent. Patented Oct. 25, 1921.

Application filed December 18, 1918. Serial No. 267,262.

*To all whom it may concern:*

Be it known that I, HERBERT W. WARREN, a citizen of the United States, residing at Osseo, in the county of Hillsdale and State of Michigan, have invented new and useful Improvements in Changeable-Speed Gears, of which the following is a specification.

This invention relates to changeable speed gear and is especially designed for use on foot propelled vehicles, such as bicycles or velocipedes, the object in view being to provide simple, effective and reliable mechanism whereby a change may be made from high speed to low speed or vice versa, conveniently and quickly and also by means of which the coaster brake may be utilized whether of the single or double or triple speed type.

With the above and other objects in view, the invention consists in the construction, combination and arrangement of parts, as herein described, illustrated and claimed.

In the accompanying drawings:

Fig. 3 is an outer face view of the center gear.

Fig. 4 is an inside face view of the ring or disk which carries the satellite gears.

Figure 1:
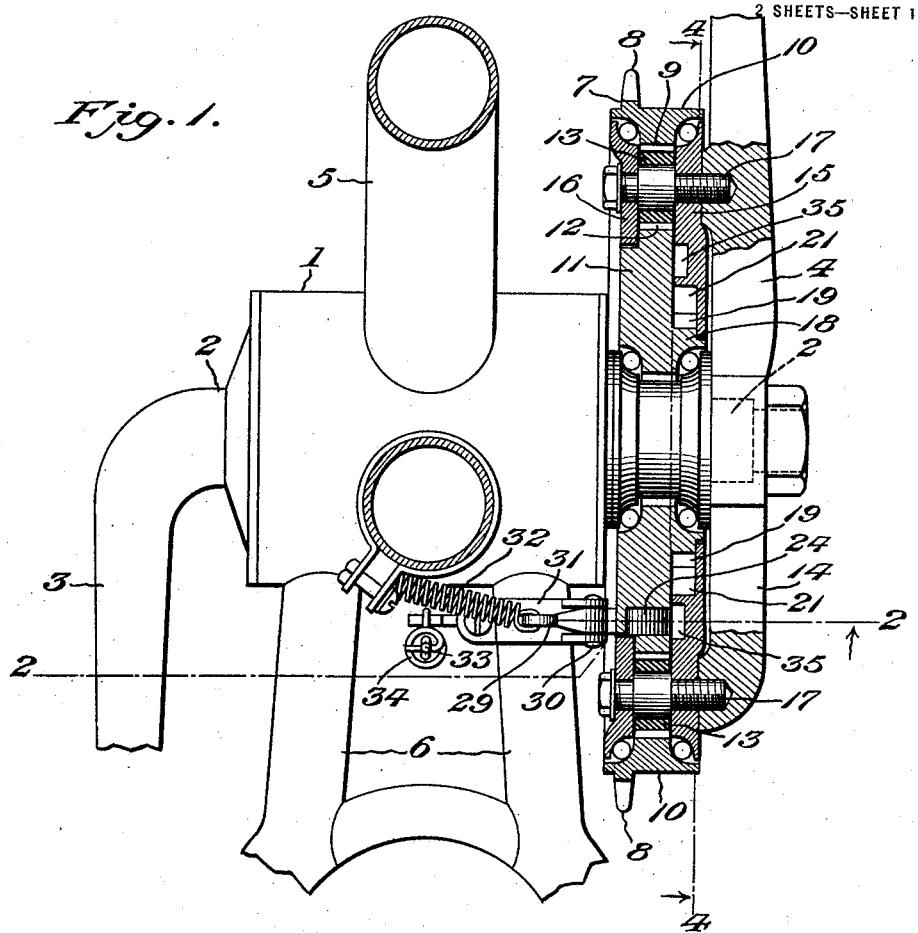
Figure 1 is a horizontal sectional view taken adjacent to the crank shaft of a manually propelled bicycle showing the improved changeable speed gearing.
Figure 2:
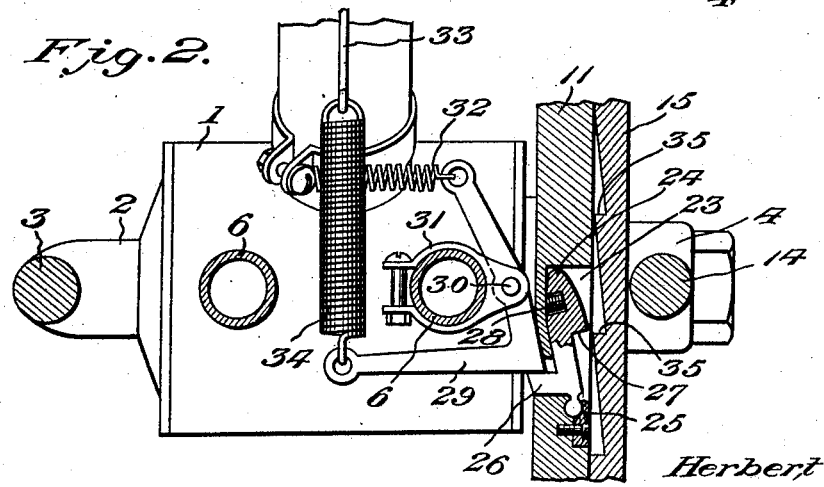
Fig. 2 is an elevation of the sprocket ring gear.

Referring to the drawings, 1 designates the crank hanger of a bicycle, 2 the crank shaft, 3 and 4 the cranks at opposite ends of the crank shaft and the crank hanger, 5 the front inclined frame bar or what is known as the reach bar of the machine, and 6 the rear forks between which the rear driving wheel of the machine is mounted to be driven by a sprocket chain, (not shown), which extends from a sprocket wheel on the rear wheel around a front driving sprocket wheel designated at 7.

The front driving sprocket 7 is in the form of a ring gear comprising a sprocket face 8 and an internal gear face 9 connected by an annular chain supporting rim 10. Arranged centrally within the ring gear 7 is a center gear 11 having a peripheral gear face 12 which meshes with a circular series of satellite gears 13, the latter also meshing with the internal gear face 9 of the ring gear 7.

Secured in fixed relation to the crank 4 which has a heel extension 14 for the purpose, is a satellite gear carrier 15, the main body of which is in the form of a ring or annulus as shown, the carrier also comprising a relatively narrow ring or annulus 16 in spaced and concentric relation to the main ring 18, the satellite gears 13 being mounted on studs or journals 17 which extend through the ring or annulus 15 and are fixedly connected to and carried by the crank 4 as clearly shown in Fig. 1.

The center gear 11 has a laterally projecting hub portion 18 formed in the periphery thereof with inclined pockets or guideways 19 for a corresponding series of clutch rollers or disks 20, the pockets 19 having inclined bottom walls along which the rollers 20 are adapted to move. The ring or annulus 15 is formed in the inner edge thereof with a series of pockets or recesses 21 to receive the clutch rollers 20 above referred to, said pockets or recesses 21 having inclined and arcuate outer faces 22. By reason of the arrangement just described, the rollers 20 are adapted to clutch and unclutch the ring or annulus 15 and the center gear 11 in relation to each other for a purpose which will presently appear. Mounted in an arcuate recess 23 in the center gear 11 is a pivoted dog 24, the same being pivotally mounted at 25 and having an inwardly projecting lip or shoulder 26 and an outwardly projecting catch lip or shoulder 27, the dog 24 being held toward the disk 15 by means of a spring 28. Arranged in coöperative relation to the dog 24 is a dog operating member 29 shown in the form of a bell crank lever, the latter being pivotally mounted at 30 on a support 31 secured to the frame of the machine. One arm of the lever 29 is connected by a spring 32 to the machine frame and serves to hold the elbow portion of said lever against the dog 24. To the other arm of the lever 29 is attached an operating connection 33 such as a cable or rod, a spring 34 being incorporated in the connection 33 to give a more flexible operation to the connection 33 and prevent binding of the parts. By pulling on the connection 33 which will ordinarily extend to a small operating lever or the like within the reach of the operator, the dog 24 may be released and allowed to move outwardly so as to disengage the ring or annulus 15, which is formed with laterally projecting teeth 35 for engagement with said dog.

From the foregoing description, taken in connection with the accompanying drawings, it will now be understood that the ring or annulus is fastened to the crank 4 and therefore rotates with the crank shaft at the same speed, carrying with it the satellite gears 13. When the dog 24 is thrown out, the satellite gears roll around the gear face 12 of the center gear which is then stationary and by meshing with the internal gear face 9 of the ring gear 7, they serve to impart an accelerated motion to said ring gear, which motion is greater by about two-thirds than the speed of rotation of the crank shaft. This produces high speed. By moving the dog 24 into locking engagement with the ring or annulus 15, the ring gear 7, the satellite gears and the central gear are in effect locked together as one part resulting in low or direct gear, the ring gear 7 being then driven at the same speed as the crank shaft. In order to make use of the coaster brake (not shown), the operator holds back on the cranks 3 and 4, thus enabling the dog 24 to move into engagement with the ring or annulus 15. This allows a backward pressure to be exerted on the ring gear 7 which has the effect of applying the coaster brake always with direct gear in a manner well understood by those familiar with the art to which this invention appertains. By employing the mechanism above described, in connection with a two speed coaster brake mechanism, four speeds are obtained and all of the speeds may be regulated to suit the manufacturer or individual purchaser by varying the sizes of the several gears and the relative number of teeth thereof.

In the same way six speeds are produced when used in connection with a three speed coaster brake mechanism, thus giving a very wide range of speed and power.

I claim:—

The combination with the crank hanger of a bicycle, the crank shaft journaled therein and the cranks at the opposite ends of the shaft, of a ring fixedly connected to and actuated by one of the cranks having its inner periphery provided with spaced pockets whose longitudinal walls are rounded, a circular series of satellite gears carried by said ring, and said ring having concentrically arranged laterally projecting teeth on the face thereof carrying the satellite gears, a ring gear extending around said series of satellite gears and having an internal gear face to mesh with said satellite gears and an outer sprocket face for the driving sprocket chain of the bicycle, a center gear journaled on the crank shaft provided with a hub portion formed with peripheral pockets whose longitudinal walls are rounded and which are disposed opposite the pockets in the ring or annulus, antifrictional rollers between the pockets of the said hub and ring, said center gear having a peripheral gear face meshing with the satellite gears and having a pocket on the inner face thereof, a spring influenced dog pivoted in the pocket for engagement with the teeth of the ring, said dog having a lateral extension projecting through the pocket and extending beyond the outer face thereof, a spring influenced bell crank lever pivotally supported on the crank hanger disposed for contacting engagement with the outer end of the projection on the dog and with the upper edge of the said projection, and a pull cord for operating the bell crank lever.

In testimony whereof I affix my signature.

HERBERT W. WARREN.